(12) United States Patent
Yamazaki et al.

(10) Patent No.: US 10,154,532 B2
(45) Date of Patent: Dec. 11, 2018

(54) USER TERMINAL, RELAY APPARATUS, AND PROCESSOR

(71) Applicant: KYOCERA CORPORATION, Kyoto (JP)

(72) Inventors: Chiharu Yamazaki, Tokyo (JP); Masato Fujishiro, Yokohama (JP); Takahiro Saiwai, Kawasaki (JP); Hiroyuki Adachi, Kawasaki (JP); Kugo Morita, Yokohama (JP); Yushi Nagasaka, Yokohama (JP); Katsuhiro Mitsui, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 1 day.

(21) Appl. No.: 15/518,683

(22) PCT Filed: Oct. 15, 2015

(86) PCT No.: PCT/JP2015/079233
§ 371 (c)(1),
(2) Date: Apr. 12, 2017

(87) PCT Pub. No.: WO2016/060217
PCT Pub. Date: Apr. 21, 2016

(65) Prior Publication Data
US 2017/0238356 A1 Aug. 17, 2017

(30) Foreign Application Priority Data

Oct. 16, 2014 (JP) ................................. 2014-211946

(51) Int. Cl.
*H04W 76/14* (2018.01)
*H04W 76/10* (2018.01)
(Continued)

(52) U.S. Cl.
CPC ............ *H04W 76/14* (2018.02); *H04B 7/155* (2013.01); *H04W 72/0406* (2013.01);
(Continued)

(58) Field of Classification Search
CPC .... H04B 7/155; H04L 67/1072; H04W 76/14; H04W 72/0406; H04W 72/1278;
(Continued)

(56) References Cited

U.S. PATENT DOCUMENTS

2012/0315905 A1* 12/2012 Zhu ...................... H04W 36/36
455/436
2015/0063295 A1* 3/2015 Himayat ........... H04W 36/0022
370/331
(Continued)

OTHER PUBLICATIONS

International Search Report issued in PCT/JP2015/079233; dated Jan. 12, 2016.
(Continued)

*Primary Examiner* — Benjamin H Elliott, IV
(74) *Attorney, Agent, or Firm* — Studebaker & Brackett PC

(57) ABSTRACT

UE (100) supports WLAN communication and WWAN communication. The WWAN communication includes WWAN direct communication which is inter-terminal direct communication in conformity to a WWAN communication standard. The UE (100) applies the WLAN communication to a user plane while applying the WWAN direct communication to a control plane. The UE (100) transmits and receives a control signal through the WWAN direct communication.

11 Claims, 12 Drawing Sheets

(51) Int. Cl.
*H04W 88/06* (2009.01)
*H04B 7/155* (2006.01)
*H04W 72/04* (2009.01)
*H04W 72/12* (2009.01)
*H04W 84/04* (2009.01)
*H04W 84/12* (2009.01)
*H04M 1/725* (2006.01)

(52) U.S. Cl.
CPC ....... *H04W 72/1278* (2013.01); *H04W 76/10* (2018.02); *H04W 88/06* (2013.01); *H04M 1/7253* (2013.01); *H04M 2250/06* (2013.01); *H04W 84/042* (2013.01); *H04W 84/12* (2013.01)

(58) Field of Classification Search
CPC . H04W 76/023; H04W 84/042; H04W 84/12; H04W 88/06; H04W 68/02; H04W 8/005; H04W 8/22; H04W 4/008; H04W 48/16
See application file for complete search history.

(56) References Cited

U.S. PATENT DOCUMENTS

| | | | |
|---|---|---|---|
| 2015/0139087 A1* | 5/2015 | Luft | H04W 52/0251 370/329 |
| 2015/0351079 A1* | 12/2015 | Himayat | H04W 28/08 370/329 |
| 2017/0070919 A1* | 3/2017 | Verger | H04L 65/1083 |
| 2017/0094638 A1* | 3/2017 | Borges | H04L 67/1072 |
| 2017/0238356 A1* | 8/2017 | Yamazaki | H04W 76/023 370/329 |

OTHER PUBLICATIONS

3rd Generation Partnership Project; Technical Specification Group Radio Access Network; Study on LTE Device to Device Proximity Services; Radio Aspects; 3GPP TR 36.843 V12.0.1; Mar. 2014; pp. 1-50; Release 12; 3GPP Organizational Partners.

* cited by examiner

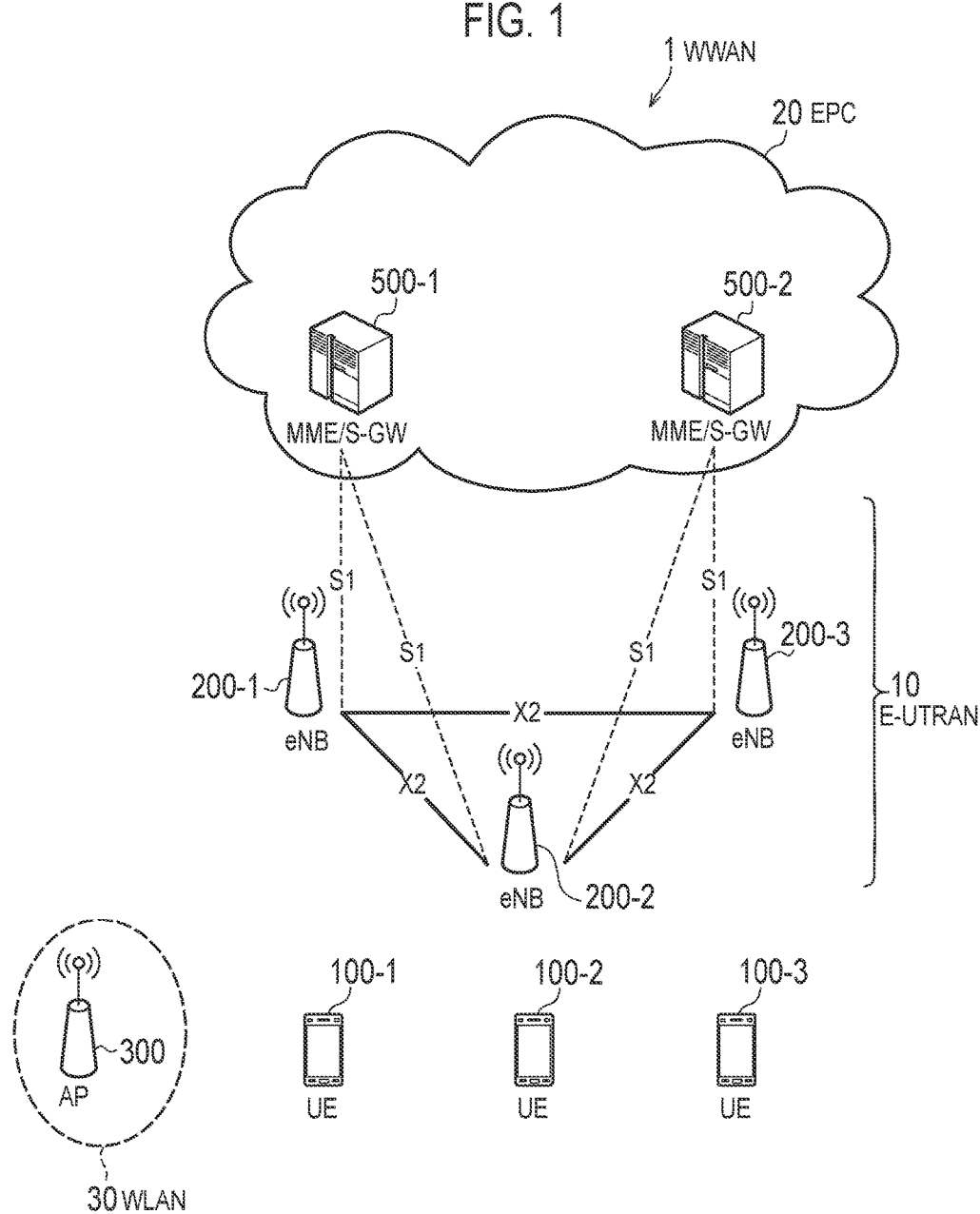

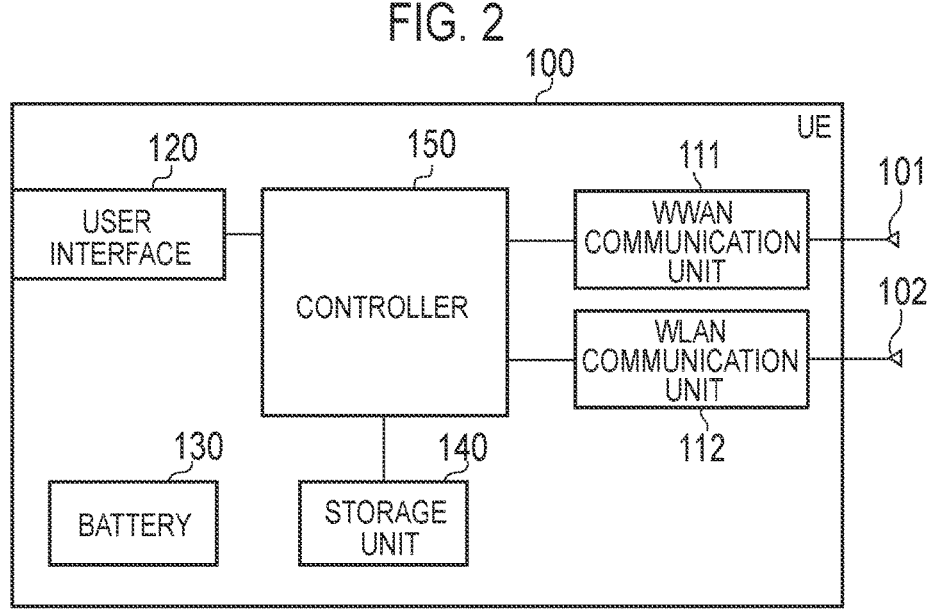
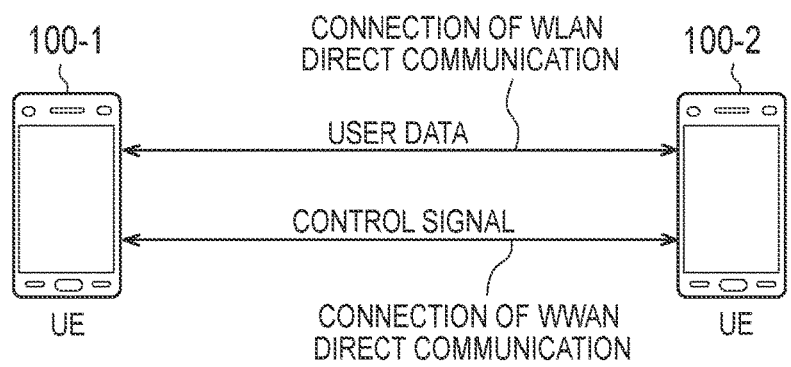

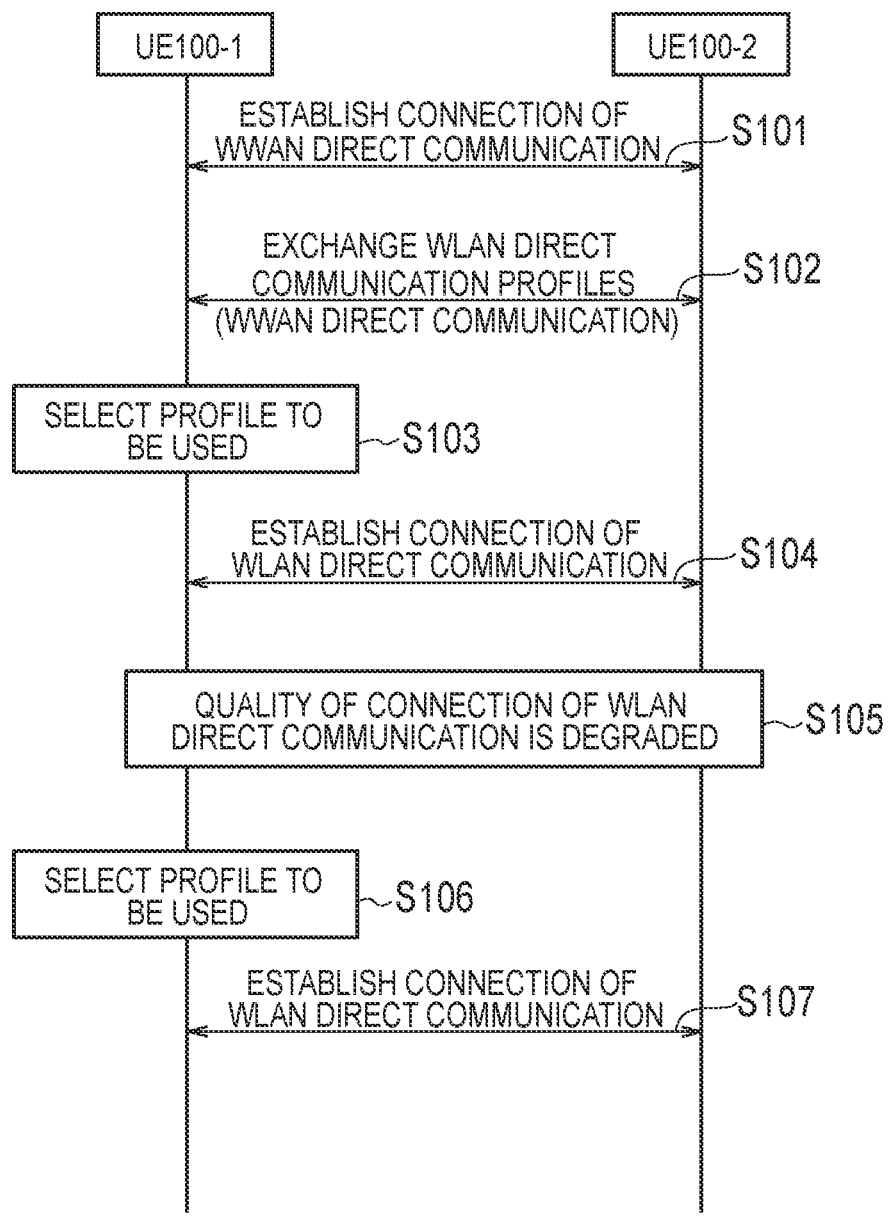

USER TERMINAL, RELAY APPARATUS, AND PROCESSOR

TECHNICAL FIELD

The present invention relates to a user terminal, a relay apparatus, and a processor that support WLAN communication and WWAN communication.

BACKGROUND ART

In the related art, wireless local area network (WLAN) direct communication which is inter-terminal direct communication in conformity to WLAN communication standards has been commercialized. The WLAN communication standards mainly indicate standards of the Institute of Electrical and Electronics Engineers (IEEE) 802.11. The standards are referred to as Wi-Fi (registered trademark: the same applies below) and WLAN direct communication is referred to as Wi-Fi direct in some cases. WLAN direct communication is generated performed at a frequency band for which license is not required (an unlicensed frequency band).

In recent years, wireless wide area network (WWAN) direct communication which is inter-terminal direct communication in conformity to WWAN communication standards has been standardized and is scheduled to be commercialized in future. The WWAN communication standards are also referred to as mobile communication standards or WWAN communication standards. In the 3rd Partnership Project (3GPP), WWAN direct communication is referred to as a device-to-device proximity-based service (D2D ProSe) (for example, see Non patent Literature 1). The WWAN direct communication is assumed to be performed at for which license is required (a licensed frequency band).

CITATION LIST

Non Patent Literature

Non patent Literature 1: 3GPP technical report "TR 36.843 V12.0.1" March 2014

SUMMARY OF INVENTION

A user terminal according to a first aspect supports WLAN communication and WWAN communication. The WWAN communication includes WWAN direct communication which is inter-terminal direct communication in conformity to a WWAN communication standard. The user terminal includes a controller configured to apply the WLAN communication to a user plane while applying the WWAN direct communication to a control plane. The controller is configured to transmit and receive a control signal through the WWAN direct communication.

A relay apparatus according to a second aspect includes a controller configured to establish connection of wireless local area network (WLAN) communication and wireless wide area network (WWAN) communication, with a user terminal. The controller is configured to establish the connection of the WWAN communication with a base station. The controller is configured to transmit and receive user data through the WLAN communication, while transmitting and receiving the control signal through the WWAN direct communication, with the user terminal. The controller is configured to transmit and receive the user data and the control signal, with the base station through the WWAN communication.

A processor according to a third aspect is included in a user terminal supporting WLAN communication and WWAN communication. The WWAN communication includes WWAN direct communication which is inter-terminal direct communication in conformity to a WWAN communication standard. The processor is configured to: apply the WLAN communication to a user plane while applying the WWAN direct communication to a control plane; and transmit and receive a control signal through the WWAN direct communication.

BRIEF DESCRIPTION OF DRAWINGS

FIG. 1 is a diagram illustrating the configuration of a system according to first to eighth embodiments.

FIG. 2 is a block diagram illustrating a user terminal (UE) according to the first to eighth embodiments.

FIG. 3 is a diagram illustrating an overview of an operation of the UE according to the first embodiment.

FIG. 4 is a diagram illustrating an operation sequence according to the first embodiment.

DESCRIPTION OF EMBODIMENTS

Overview of Embodiments

Figure 5:
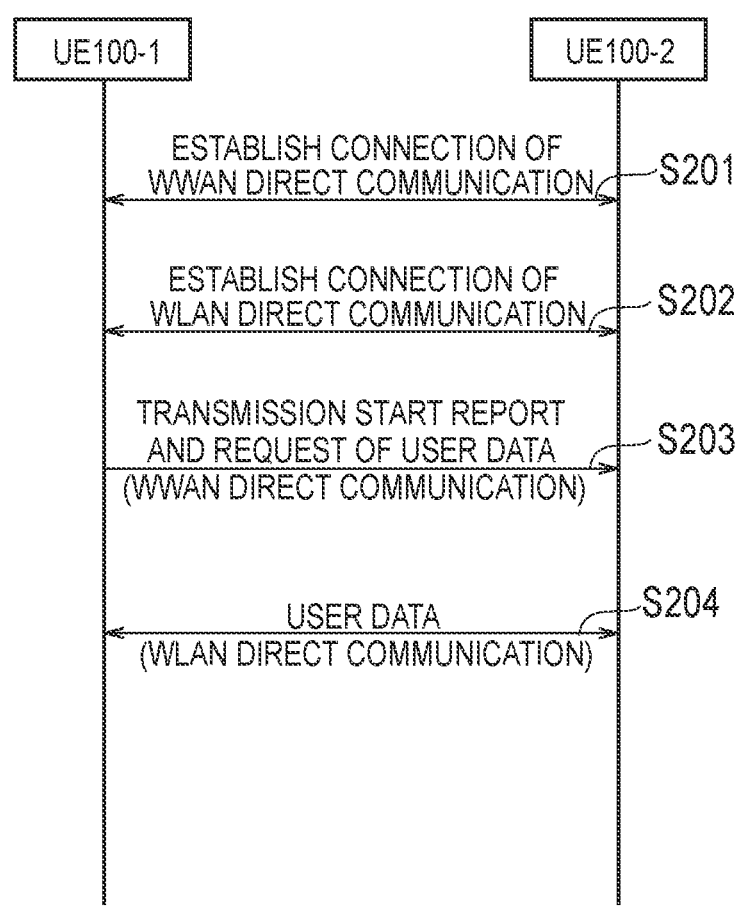
FIG. 5 is a diagram illustrating operation sequence 1 according to the second embodiment.

Either WLAN direct communication or WWAN direct communication is an inter-terminal direct communication scheme and is assumed to be used separately and independently. However, since the WWAN direct communication has various advantages. Therefore, when the WWAN direct communication is used alone, there is a problem of the advantages not be gained.

The embodiments disclose a user terminal, a communication control method, and a processor enabling WWAN direct communication to be used more efficiently.

A user terminal according to first to eighth embodiments supports WLAN communication and WWAN communication. The WWAN communication includes WWAN direct communication which is inter-terminal direct communication in conformity to a WWAN communication standard. The user terminal includes a controller configured to apply the WLAN communication to a user plane while applying the WWAN direct communication to a control plane. The controller is configured to transmit and receive a control signal through the WWAN direct communication.

In the first to sixth embodiments, the WLAN communication includes WLAN direct communication which is inter-terminal direct communication in conformity to a WLAN communication standard. The controller is configured to transmit and receive user data through the WLAN direct communication.

In the first to sixth embodiments, the control signal includes information for controlling the WLAN communication.

In the first embodiment, the information is information necessary to establish connection of the WLAN communication.

In the first embodiment, if the controller determines that connection of the WLAN communication is not maintainable, the controller is configured to perform control of establishing new connection of the WLAN communication based on the information.

In the second embodiment, the information is information for requesting or reporting at least one of transmission start of the user data, transmission stop of the user data, reception start of the user data, and reception stop of the user data.

In the third embodiment, the information is at least one of acknowledgment information, channel state information, and modulation coding scheme information.

In the fourth embodiment, if the controller determines that connection of the WLAN communication is not maintainable, the controller is configured to perform control of switching the user plane from the WLAN communication to the WWAN communication.

In the fifth embodiment, based on a WWAN radio signal received from another user terminal, the controller is configured to determine whether connection of the WLAN direct communication is able to be established or maintained with the other user terminal.

In the sixth embodiment, if the user terminal serves as an access point in the WLAN communication, the controller is configured to establish the WWAN direct communication with another user terminal serving as another access point. The control signal includes information for scheduling radio resources for the WLAN communication.

In the seventh embodiment, the WLAN communication includes WLAN direct communication which is inter-terminal direct communication in conformity to a WLAN communication standard. The controller is configured to perform one of transmission and reception of the user data through the WLAN direct communication, while performing the other of the transmission and the reception of the user data through the WWAN direct communication.

In the eighth embodiment, the controller is configured to establish connection of the WLAN communication and connection of the WWAN direct communication, with a relay apparatus that relays user data and a control signal. The controller is configured to transmit and receive the user data through the WLAN communication, while transmitting and receiving the control signal through the WWAN direct communication.

A communication control method according to first to eighth embodiments is a method in a user terminal supporting WLAN communication and WWAN communication. The WWAN communication includes WWAN direct communication which is inter-terminal direct communication in conformity to a WWAN communication standard. The communication control method includes steps of: applying the WLAN communication to a user plane while applying the WWAN direct communication to a control plane; and transmitting and receiving a control signal through the WWAN direct communication.

A processor according to first to eighth embodiments is included in a user terminal supporting WLAN communication and WWAN communication. The WWAN communication includes WWAN direct communication which is inter-terminal direct communication in conformity to a WWAN communication standard. The processor is configured to: apply the WLAN communication to a user plane while applying the WWAN direct communication to a control plane; and transmit and receive a control signal through the WWAN direct communication.

First Embodiment

In a first embodiment, an example in which a wireless wide area network (WWAN) communication standard is a 3GPP Long Term Evolution (LTE) standard will be described. An example in which a wireless local area network (WLAN) communication standard is a Wi-Fi standard will be described.

(System Configuration)

Hereinafter, a system configuration according to the first embodiment will be described. FIG. 1 is a diagram illustrating the configuration of a system according to a first embodiment.

As illustrated in FIG. 1, the system according to the first embodiment includes a WWAN 1, a WLAN 30, and a user terminal (UE) 100.

The WWAN 1 includes an evolved-UMTS terrestrial radio access network (E-UTRAN) 10 and an evolved packet core (EPC) 20. The E-UTRAN 10 is equivalent to a radio access network and the EPC 20 is equivalent to a core network. A frequency band for which license is required (a licensed frequency band) can be allocated to the WWAN 1.

The E-UTRAN 10 includes a plurality of eNBs 200 (evolved Node-B). The eNB 200 is equivalent to a base station. The eNB 200 manages one cell or a plurality of cells and performs WWAN communication with the UE 100 which exists in the self-cell. The eNB 200 has a radio resource management (RRM) function, a user data routing function, and a measurement control function of performing mobility control and scheduling.

The eNBs 200 are connected to each other via X2 interfaces. The eNBs 200 are connected to mobility management entity (MME)/serving-gateways (S-GW) 500 included in the EPC 20 via S1 interfaces. The MME is a network node that performs various kinds of mobility control or the like on the UEs 100 and is equivalent to a control station. The S-GW is a network node that performs transmission control of user data and is equivalent to a switching station.

The WLAN 30 includes an access point (AP) 300. The AP 300 is, for example, an AP (operator controlled AP) that is managed by a network operator of the WWAN 1. The AP 300 performs WLAN communication with the UEs 100 at frequency bands for which license is not required (an unlicensed frequency band).

The UE 100 is a radio communication apparatus which can move. The UE 100 is a terminal that supports both communication schemes of WWAN communication and WLAN communication (a so-called dual terminal).

(Configuration of User Terminal)

Hereinafter, the configuration of the UE 100 according to the first embodiment will be described. FIG. 2 is a block diagram illustrating the UE 100.

As illustrated in FIG. 2, the UE 100 includes antennas 101 and 102, a WWAN communication unit 111, a WLAN communication unit 112, a user interface 120, a battery 130, a storage unit 140, and a controller 150. When the UE 100 is a card type terminal, the UE 100 may not include the user interface 120 and the battery 130. Two or more blocks among the WWAN communication unit 111, the WLAN communication unit 112, the storage unit 140, and the controller 150 may be integrated on one chip.

The antenna 101 and the WWAN communication unit 111 are used to transmit and receive WWAN radio signals. The WWAN communication unit 111 converts a baseband signal output by the controller 150 into a WWAN radio signal and transmits the WWAN radio signal from the antenna 101. The WWAN communication unit 111 converts a WWAN radio signal received by the antenna 101 into a baseband signal and outputs the baseband signal to the controller 150.

The antenna 102 and the WLAN communication unit 112 are used to transmit and receive WLAN radio signals. The WLAN communication unit 112 converts a baseband signal output by the controller 150 into a WLAN radio signal and transmits the WLAN radio signal from the antenna 102. The WLAN communication unit 112 converts a WLAN radio signal received by the antenna 102 into a baseband signal and outputs the baseband signal to the controller 150.

The user interface 120 includes an interface with a user carrying the UE 100 and includes a display, a microphone, a speaker, and various buttons. The user interface 120 receives an input from the user and outputs a signal indicating content of the user input to the controller 150. The battery 130 stores power to be supplied to each block of the UE 100.

The storage unit 140 includes a memory that stores programs to be executed by the controller 150 and various kinds of information used for a process by the controller 150. The controller 150 controls various kinds of processes to be described below. The controller 150 includes a processor that executes a program stored in the storage unit 140 to perform various processes. The controller 150 may include a codec that encodes and decodes audio and video signals.

(Overview of Operation of User Terminal)

Hereinafter, an overview of an operation of the UE 100 according to the first embodiment will be described.

The UE 100 supports WLAN communication and WWAN communication. The WLAN communication includes WLAN direct communication which is inter-terminal direct communication in conformity to a WLAN communication standard. In the first embodiment, the WLAN direct communication is Wi-Fi direct. The WWAN communication includes WWAN direct communication which is inter-terminal direct communication in conformity to a WWAN communication standard. In the first embodiment, the WWAN direct communication is a device-to-device proximity-based service (D2D ProSe).

From the viewpoint of utilizing an unlicensed frequency band, the WLAN direct communication (Wi-Fi direct) is more advantageous than the WWAN direct communication (D2D ProSe). However, the WLAN direct communication is more disadvantages than the WWAN direct communication in that an upper limit of a communication distance is short. The WLAN direct communication has a high upper limit of a communication speed theoretically, but has a problem that a communication speed degrades due to congestion.

FIG. 3 is a diagram illustrating an overview of an operation of the UE 100 according to the first embodiment.

As illustrated in FIG. 3, the UE 100 (the UEs 100-1 and 100-2) applies the WLAN direct communication to a user plane (U-plane) and applies the WWAN direct communication to a control plane (C-plane). The user plane refers to a process of transmitting and receiving user data. The control plane refers to a process of transmitting and receiving a control signal.

The UEs 100-1 and 100-2 establish connection of the WLAN direct communication. The UEs 100-1 and 100-2 transmit and receive user data through the WLAN direct communication. The UEs 100-1 and 100-2 establish connection of the WWAN direct communication. The UEs 100-1 and 100-2 transmit and receive control signals through the WWAN direct communication. It is preferable that the UEs 100-1 and 100-2 normally maintain the connection of the WWAN direct communication when the UEs 100-1 and 100-2 perform the WWAN direct communication.

In this way, by applying the WLAN direct communication to the user plane, it is possible to realize high-speed user data transmission utilizing an unlicensed frequency band. By applying the WWAN direct communication to the control plane, it is possible to realize high-reliable control signal transmission. Accordingly, it is possible to high-speed and high-reliable inter-terminal direct communication.

When the UEs 100-1 and 100-2 establish the WWAN direct communication or transmit and receive a control signal through the WWAN direct communication, the UEs 100-1 and 100-2 may perform control such that a control signal is not transmitted and received through the WLAN direct communication.

On the other hand, when the UEs 100-1 and 100-2 establish the WWAN direct communication or transmit and receive a control signal through the WWAN direct communication, the UEs 100-1 and 100-2 may transmit and receive a specific control signal through the WLAN direct communication. The specific control signal mentioned here may be a control signal that includes information not included in the control signal transmitted and received through the WWAN direct communication.

When the UEs 100-1 and 100-2 establish the WLAN direct communication or transmit and receive user data through the WLAN direct communication, the UEs 100-1 and 100-2 may perform control such that user data is not transmitted and received through the WWAN direct communication.

On the other hand, when the UEs 100-1 and 100-2 establish the WLAN direct communication or transmit and receive user data through the WLAN direct communication, the UEs 100-1 and 100-2 may transmit and receive specific user data through the WWAN direct communication. The specific user data mentioned here may be user data that includes information not included in the user data transmitted and received through the WLAN direct communication.

(Operation Sequence in First Embodiment)

Hereinafter, an operation sequence according to the first embodiment will be described. In the first embodiment, a control signal includes information for controlling the WLAN direct communication. The information is information necessary to establish connection of the WLAN direct communication.

FIG. 4 is a diagram illustrating an operation sequence according to the first embodiment. In the WLAN direct communication, one UE 100 serves as an access point. In FIG. 4, a case in which the UE 100-1 serves as an access point is exemplified.

As illustrated in FIG. 4, in step S101, the UEs 100-1 and 100-2 establish connection of the WWAN direct communication. A procedure for establishing the connection of the WWAN direct communication includes a process of establishing synchronization between the UEs 100-1 and 100-2. The procedure for establishing the connection of the WWAN direct communication may include a process of mutually identifying the UEs 100 by transmitting and receiving a discovery signal.

In step S102, the UEs 100-1 and 100-2 exchanges WLAN direct communication profiles via the connection of the WWAN direct communication. The WLAN direct communication profiles are information necessary to establish the connection of the WLAN direct communication. The WLAN direct communication profile includes information regarding supported frequencies, channel information, a basic service set identifier (BSSID), and mutually identified security information. The supported frequencies are, for example, 2.4 GHz, 5 GHz, and 60 GHz. The channel information is information regarding channels included in the supported frequencies.

The WLAN direct communication profile exchanged here may also include priority in which the WLAN direct communication profile is used. For example, at the time of initial connection, a WLAN direct communication profiles with the highest priority is used. Thereafter, when a state in which the UE enters the WLAN direct communication is not maintainable, a WLAN direct communication profile with next highest priority is used.

In step S103, the UE 100-1 selects the profile used at the time of the initial connection of the WLAN direct communication among the WLAN direct communication profiles exchanged in step S102.

In step S104, the UE 100-1 establishes connection of the WLAN direct communication based on the profile selected in step S103. After the UEs 100-1 and 100-2 establish the connection of the WLAN direct communication, the UEs 100-1 and 100-2 transmit and receive user data through the WLAN direct communication.

In step S105, quality of the connection of the WLAN direct communication is degraded and the UEs 100-1 and 100-2 enter the state in which the connection of the WLAN direct communication is not maintainable. Based on an error rate of the received user data, the UE 100-1 may determine whether the UE 100-1 is in the state in which connection of the WLAN direct communication is not maintainable. For example, based on a criterion in which SNR of a channel used for the WLAN direct communication is less than a predetermined value for a given time or more or data transmission fails continuously (Nack is returned), the UE 100-1 may determine that the UE 100-1 in the state in which the connection of the WLAN direct communication is not maintainable. Alternatively, based on the received WWAN radio signal, the UE 100-1 may determine that the UE 100-1 is in the state in which the connection of the WLAN direct communication is not maintainable. Such an operation will be described in a fifth embodiment.

In step S106, the UE 100-1 reselects a profile to be used for new connection of the WLAN direct communication among the WLAN direct communication profiles exchanged in step S102.

In step S107, the UE 100-1 establishes the new connection of the WLAN direct communication based on the profile reselected in step S106. After the new connection of the WLAN direct communication is established, the UEs 100-1 and 100-2 continue to transmit and receive the user data through the WLAN direct communication.

In the first embodiment, when the UE 100-1 determines that the connection of the WLAN direct communication is not maintainable, the UE 100-1 performs control such that new connection of the WLAN direct communication is established based on the information (the WLAN direct communication profile) included in the control signal. Thus, even when the UE 100-1 enters the state in which the connection of the WLAN direct communication is not maintainable, new connection of the WLAN direct communication is established quickly and the user data can be continuously transmitted and received.

Second Embodiment

Next, in a second embodiment, differences from the first embodiment will be mainly described. The configuration of the system and the configuration and the overview of the operation of the user terminal according to the second embodiment are the same as those according to the first embodiment.

Hereinafter, an operation sequence according to the second embodiment will be described. In the second embodiment, a control signal includes information for requesting or reporting at least one of transmission start of user data, transmission stop of the user data, reception start of the user data, and reception stop of the user data.

FIG. 5 is a diagram illustrating operation sequence 1 according to the second embodiment.

As illustrated in FIG. 5, in step S201, the UEs 100-1 and 100-2 establish connection of the WWAN direct communication.

In step S202, the UEs 100-1 and 100-2 establish connection of WLAN direct communication.

In step S203, the UE 100-1 transmits a transmission start report of the user data and a transmission start request of the user data to the UE 100-2 via the connection of the WWAN direct communication. The transmission start report of the user data and the transmission start request of the user data may include at least one piece of information of a transmission timing of the user data and a transmission data amount of the user data.

In step S204, the UEs 100-1 and 100-2 transmit and receive the user data via the connection of the WLAN direct communication. Specifically, the UE 100-1 transmits the transmission start report of the user data through the WWAN direct communication and subsequently transmits the user data to the UE 100-2 through the WLAN direct communication. Alternatively, the UE100-2 receives the transmission start request of the user data through the WWAN direct communication and subsequently transmits the user data to the UE 100-1 through the WLAN direct communication. Alternatively, when the connection of the WLAN direct communication is not established at the time of the reception of the transmission start request of the user data through the WWAN direct communication, the UE 100-2 may receive the transmission start request of the user data through the WWAN direct communication and subsequently operate to establish the WLAN connection.

Figure 6:
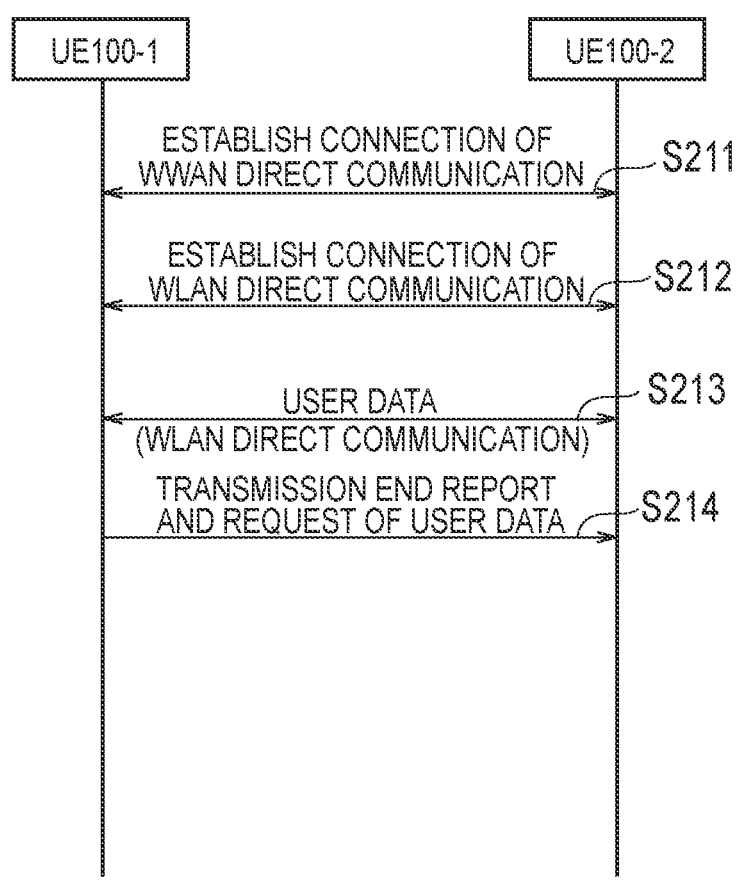
FIG. 6 is a diagram illustrating operation sequence 2 according to the second embodiment.

FIG. 6 is a diagram illustrating operation sequence 2 according to the second embodiment.

As illustrated in FIG. 6, in step S211, the UEs 100-1 and 100-2 establish connection of the WWAN direct communication.

In step S212, the UEs 100-1 and 100-2 establish connection of the WLAN direct communication. After the connection of the WLAN direct communication is established, the UEs 100-1 and 100-2 transmit and receive the user data through the WLAN direct communication in step S213.

In step S214, the UE 100-1 transmits a transmission end report of the user data and a transmission end request of the user data via the connection of the WWAN direct communication to the UE 100-2. The transmission end report of the user data and the transmission end request of the user data may include information regarding a transmission end timing of the user data.

Then, the UEs 100-1 and 100-2 end the transmission and reception of the user data. Specifically, the UE 100-1 transmits the transmission end report of the user data and subsequently ends the transmission of the user data. Alternatively, the UE 100-2 receives the transmission end request of the user data and subsequently ends the transmission of the user data.

When the transmission and reception of the user data ends, the connection of the WLAN direct communication is maintained. Alternatively, when the transmission and reception of the user data ends, the connection of the WLAN direct communication may be cut off.

When the transmission and reception of the user data ends, the connection of the WWAN direct communication is maintained. Alternatively, when the transmission and reception of the user data ends, the connection of the WWAN direct communication may be cut off.

According to the second embodiment, the start and end of the transmission of the user data through the WLAN direct communication can be controlled through the WWAN direct communication.

Third Embodiment

Next, in a third embodiment, differences from the first and second embodiments will be mainly described. The configuration of the system and the configuration and the overview of the operation of the user terminal according to the third embodiment are the same as those according to the first embodiment.

(Operation According to Third Embodiment)

Hereinafter, an operation sequence according to the third embodiment will be described. In the third embodiment, a control signal includes at least one piece of information (hereinafter referred to as "transmission control information") among acknowledgment information, channel state information, and modulation coding scheme information.

The acknowledgment information is information (Ack/Nack) indicating whether reception (decoding) of the user data is successful.

The channel state information is information (CSI: Channel State Information) indicating a channel state of the WLAN direct communication. The channel state information may be a channel quality indicator (CQI) corresponding reception quality. When multiple input multiple output (MIMO) is applied to the WLAN direct communication, the channel state information may be a precoder matrix indicator (PMI) and a rank indicator (RI). Alternatively, the channel state information may be information indicating a channel state of the WWAN direct communication.

The modulation coding scheme information is information indicating a modulation coding scheme (MCS) of the user data.

Figure 7:
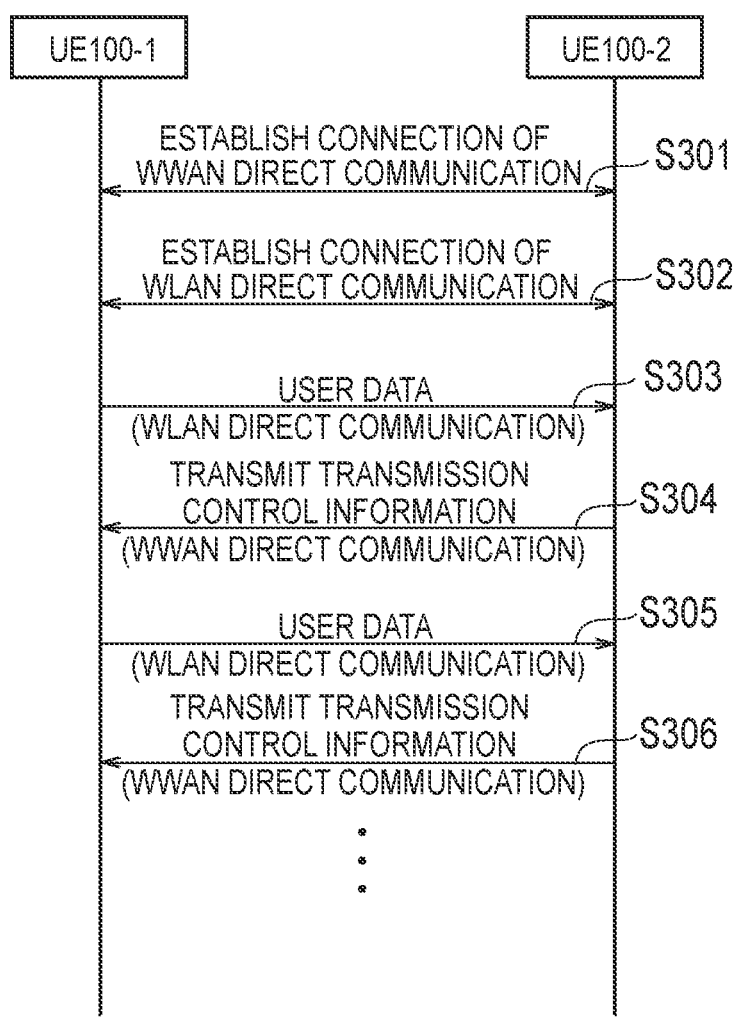
FIG. 7 is a diagram illustrating an operation sequence according to the third embodiment.

FIG. 7 is a diagram illustrating an operation sequence according to the third embodiment. Here, transmission control information feed from the UE 100-2 back to the UE 100-1 will be exemplified.

As illustrated in FIG. 7, in step S301, the UEs 100-1 and 100-2 establish connection of the WWAN direct communication.

In step S302, the UEs 100-1 and 100-2 establish connection of the WLAN direct communication.

In step S303, the UE 100-1 transmits the user data to the UE 100-1 via the connection of the WLAN direct communication. The UE 100-2 receives the user data and performs measurement of reception quality and decoding of the user data.

In step S304, the UE 100-2 transmits the transmission control information to the UE 100-1 via the connection of the WWAN direct communication. The transmission control information includes acknowledgment information and channel state information. The UE 100-1 receives the transmission control information from the UE 100-2.

In step S305, the UE 100-1 transmits the user data to the UE 100-1 via the connection of the WLAN direct communication based on the transmission control information (the acknowledgment information and the channel state information) received from the UE 100-2. The UE 100-1 may retransmit the user data based on the acknowledgment information. The UE 100-1 may change a modulation coding scheme and an MIMO transmission scheme of the user data based on the channel state information. The UE 100-2 receives the user data and performs the measurement of the reception quality and decoding of the user data.

In step S306, the UE 100-2 transmits the transmission control information (the acknowledgment information and the channel state information) to the UE 100-1 via the connection of the WWAN direct communication. The UE 100-1 receives the transmission control information from the UE 100-2. Thereafter, the same operation is repeated until the transmission of the user data ends.

According to the third embodiment, it is possible to dynamically control the transmission of the user data performed through the WLAN direct communication through the WWAN direct communication.

Fourth Embodiment

Next, in a fourth embodiment, differences from the first to third embodiments will be mainly described. The configuration of the system and the configuration and the overview of the operation of the user terminal according to the fourth embodiment are the same as those according to the first embodiment.

Hereinafter, an operation sequence according to the fourth embodiment will be described. In the fourth embodiment, when the UE 100 determines that the connection of the WLAN direct communication is not maintainable, the UE 100 performs control such that the user plane is switched from the WLAN direct communication to the WWAN communication. The "switching of the user plane to the WWAN communication" is not limited to the switching of the user plane to the WWAN direct communication and also includes switching of the user plane to normal WWAN communication. The normal WWAN communication is communication via WWAN 1 which is an infrastructure network.

Figure 8:
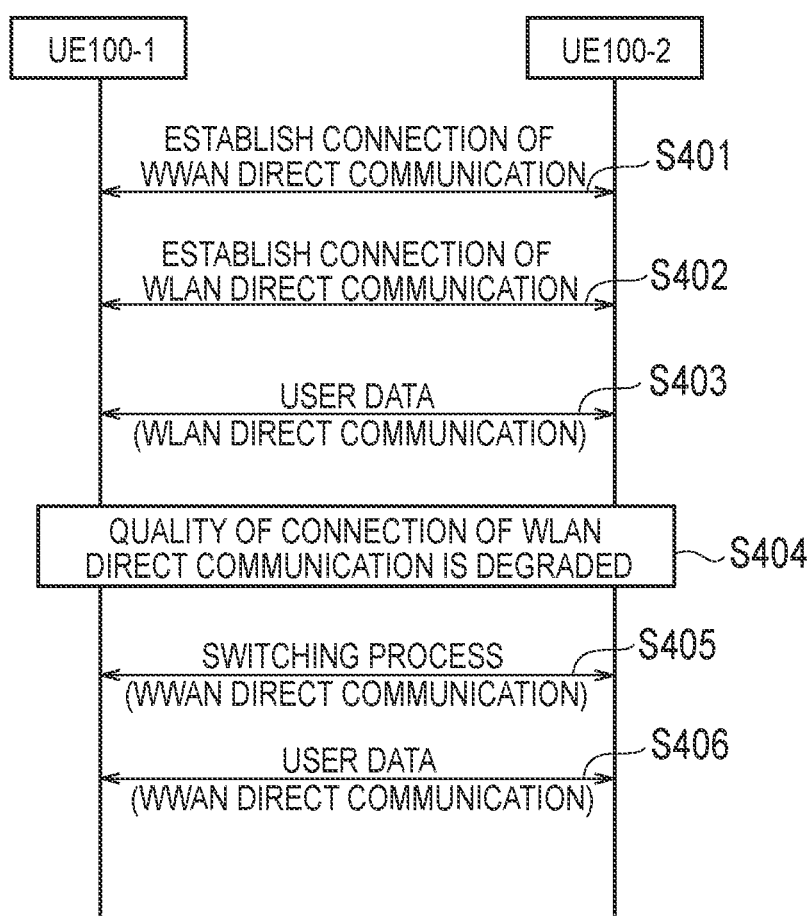
FIG. 8 is a diagram illustrating an operation sequence according to the fourth embodiment.

FIG. 8 is a diagram illustrating an operation sequence according to the fourth embodiment.

As illustrated in FIG. 8, in step S401, the UEs 100-1 and 100-2 establish connection of the WWAN direct communication.

In step S402, the UEs 100-1 and 100-2 establish connection of the WLAN direct communication.

In step S403, the UEs 100-1 and 100-2 transmit and receive the user data via the connection of the WLAN direct communication.

In step S404, quality of the connection of the WLAN direct communication is degraded and the UEs enter the state in which the connection of the WLAN direct communication is not maintainable. The method of determining the state in which the connection of the WLAN direct communication is not maintainable is the same as that according to the first embodiment.

In step S405, the UEs 100-1 and 100-2 switch the user plane from the WLAN direct communication to the WWAN direct communication. For example, the UEs 100-1 and 100-2 perform the switching process in such a manner that the UE 100-1 requests the UE 100-2 to switch the user plane from the WLAN direct communication to the WWAN direct communication and the UE 100-2 responds to the request.

In step S406, the UEs 100-1 and 100-2 transmit and receive the user data via the connection of the WWAN direct communication. In this case, both of the user data and the control signal are transmitted and received through the WWAN direct communication.

According to the fourth embodiment, when the UEs enter the state in which the connection of the WLAN direct communication is not maintainable, the user data can be continuously transmitted and received by switching the user plane to the WWAN direct communication.

When the user data is transmitted and received through the WWAN direct communication and the eNB 200 gives an instruction of an off-road to the WLAN, the UE 100 may switch the user plane from the WWAN direct communication to the WLAN direct communication and perform the WLAN direct communication.

Fifth Embodiment

Next, in a fifth embodiment, differences from the first to fourth embodiments will be mainly described. The configuration of the system and the configuration and the overview of the operation of the user terminal according to the fifth embodiment are the same as those according to the first embodiment.

Hereinafter, an operation sequence according to the fifth embodiment will be described. In the fifth embodiment, based on a WWAN radio signal received from another UE 100, the UE 100 determines whether connection of the WLAN direct communication with the other UE 100 can be established and maintained.

Figure 9:
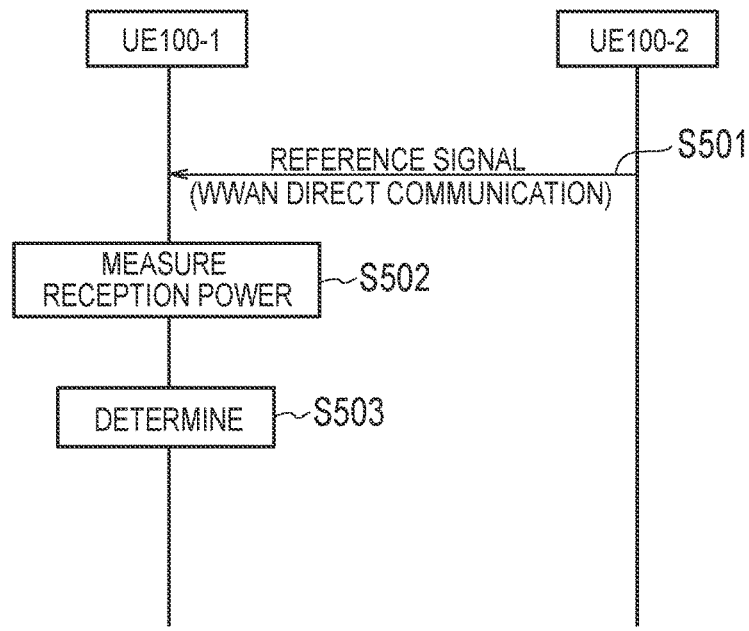
FIG. 9 is a diagram illustrating operation sequence 1 according to the fifth embodiment.

FIG. 9 is a diagram illustrating operation sequence 1 according to the fifth embodiment. In an initial state of the present sequence, the UEs 100-1 and 100-2 are assumed to be in a state in which the connection of the WWAN direct communication and the connection of the WLAN direct communication are established.

As illustrated in FIG. 9, in step S501, the UE 100-2 transmits a reference signal of the WWAN direct communication. The reference signal is a WWAN radio signal in a signal sequence, a transmission resource, and transmission power are known. The UE 100-1 receives the reference signal of the WWAN direct communication.

In step S502, the UE 100-1 measures reception power of the reference signal of the WWAN direct communication. The UE 100-1 may measure reception quality of the reference signal of the WWAN direct communication. The reception quality is, for example, a signal-to-interference plus noise power ratio (SINR).

In step S503, based on a measurement result in step S502, the UE 100-1 determines whether the connection of the WLAN direct communication can be maintained with the UE 100-2. For example, the UE 100-1 determines that the connection of the WLAN direct communication is not maintainable according to the fact that the reception power of the reference signal of the WWAN direct communication is less than a threshold. Alternatively, the UE 100-1 may estimate a propagation loss (path loss) based on the reception power of the reference signal of the WWAN direct communication and may determine that the connection of the WLAN direct communication is not maintainable according to the fact that an inter-terminal distance corresponding to the propagation loss is greater than the threshold. The propagation loss can be set to a value obtained by reducing reception power from transmission power of the reference signal of the WWAN direct communication. Alternatively, the UE 100-1 may determine that the connection of the WLAN direct communication is not maintainable according to the fact that the reception quality of the reference signal of the WWAN direct communication is less than the threshold.

In the sequence of FIG. 9, the state in which the connection of the WWAN direct communication is established is assumed to be an initial state. However, when the connection of the WWAN direct communication is not established is set as the initial state, the UE 100-1 determines in step S503 that the connection of the WLAN direct communication can be established with the UE 100-2 based on the reference signal received from the UE 100-2.

Figure 10:
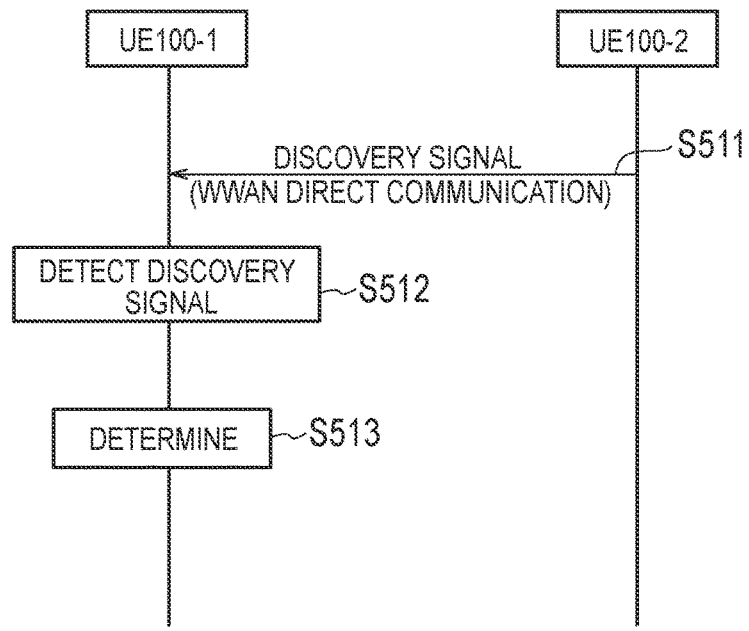
FIG. 10 is a diagram illustrating operation sequence 2 according to the fifth embodiment.

FIG. 10 is a diagram illustrating operation sequence 2 according to the fifth embodiment. In the initial state of the present sequence, the UEs 100-1 and 100-2 are assumed to be in a state in which the connection of the WLAN direct communication is not established. The UEs 100-1 and 100-2 may not establish the connection of the WWAN direct communication.

As illustrated in FIG. 10, in step S511, the UE 100-2 transmits a discovery signal. The discovery signal is a WWAN radio signal for discovering a communication state of the WWAN direct communication. The discovery signal includes identification information regarding a transmission source of the discovery signal. It is preferable that the UE 100-2 transmits the discovery signal periodically.

The UE 100-1 monitors the discovery signal to detect the discovery signal from the UE 100-2 (step S512).

In step S513, the UE 100-1 determines that the connection of the WLAN direct communication can be established with the UE 100-2 according to detection of the discovery signal in step S512. When the UE 100-1 does not detect the discovery signal during a predetermined period, the UE 100-1 may determine that the connection of the WLAN direct communication is not maintainable with the UE 100-2.

In the sequence of FIG. 10, the state in which the connection of the WLAN direct communication is not established is assumed as the initial state. However, when the state in which the connection of the WLAN direct communication is established is set as the initial state, the UE 100-1 determines in step S513 that the connection of the WLAN direct communication is maintainable with the UE 100-2 based on the discovery signal received from the UE 100-2.

According to the fifth embodiment, whether the connection of the WLAN direct communication can be established or maintained can be determined appropriately using characteristics in which a communicable distance of the WWAN direct communication is longer than that of the WLAN direct communication based on the WWAN direct communication.

Sixth Embodiment

Next, in a sixth embodiment, differences from the first to fifth embodiments will be mainly described. The configuration of the system and the configuration and the overview of the operation of the user terminal according to the sixth embodiment are the same as those according to the first embodiment.

Hereinafter, an overview of the operation of the UE 100 according to the sixth embodiment will be described. In the sixth embodiment, when the self-UE 100 serves as an access point in the WLAN direct communication, the UE 100 establishes the connection of the WWAN direct communication with another UE 100 serving as the access point. A control signal includes information for scheduling radio resources in the WLAN direct communication.

Figure 11:
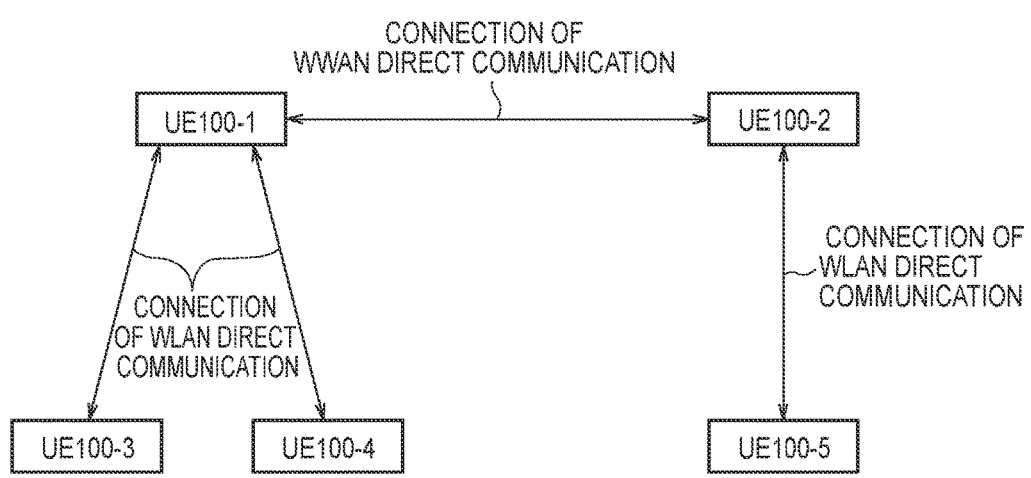
FIG. 11 is a diagram illustrating an overview of an operation of the UE according to the sixth embodiment.

FIG. 11 is a diagram illustrating an overview of an operation of the UE 100 according to the sixth embodiment. In FIG. 11, a case in which each of the UEs 100-1 and 100-2 serves as an access point in the WLAN direct communication will be exemplified.

As illustrated in FIG. 11, the UE 100-1 establishes connection of the WLAN direct communication with UEs 100-3 and 100-4. The UE 100-1 transmits and receives the user data to and from the UEs 100-3 and 100-4 via the connection of the WLAN direct communication.

The UE 100-2 establishes connection of the WLAN direct communication with a UE 100-5. The UE 100-2 transmits and receives the user data to and from the UE 100-5 via the connection of the WLAN direct communication.

Further, the UE 100-1 establishes connection of the WWAN direct communication with the UE 100-2. The UE 100-1 transmits and receives a control signal to and from the UE 100-2 via the connection of the WWAN direct communication. The control signal includes information for scheduling radio resources in the WLAN direct communication. The radio resources in the WLAN direct communication are, for example, frequency channels or subchannels in the frequency channels.

Figure 12:
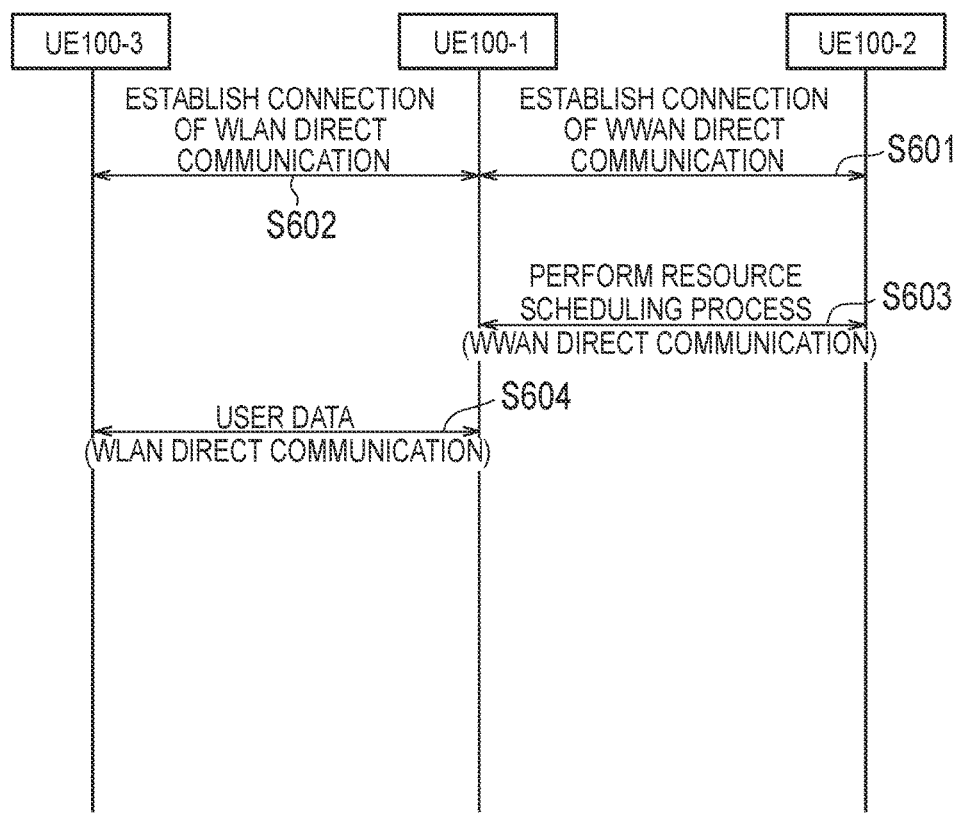
FIG. 12 is a diagram illustrating an operation sequence according to the sixth embodiment.

Hereinafter, an operation sequence according to the sixth embodiment will be described. FIG. 12 is a diagram illustrating an operation sequence according to the sixth embodiment.

As illustrated in FIG. 12, in step S601, the UE 100-1 establishes connection of the WWAN direct communication with the UE 100-2.

In step S602, the UE 100-1 establishes connection of the WLAN direct communication with the UE 100-3.

In step S603, the UE 100-1 performs a process of scheduling the radio resources in the WLAN direct communication with the UE 100-2 via the connection of the WWAN direct communication. For example, the UE 100-1 performs the scheduling process by reporting the radio resources desired to be used by the UE 100-1 to the UE 100-2 and responding to the UE 100-2. The radio resources scheduled by the UE 100-1 are prohibited from being used by the UE 100-2 and are restricted.

In step S604, the UE 100-1 transmits and receives the user data to and from the UE 100-3 through the WLAN direct communication using the scheduled radio resources.

According to the sixth embodiment, by scheduling the radio resources in the WLAN direct communication through the WWAN direct communication, it is possible to avoid degradation of a communication speed of the WLAN direct communication even when the UEs 100 performing the WLAN direct communication crowd.

Seventh Embodiment

Next, in a seventh embodiment, differences from the first to sixth embodiments will be mainly described. The configuration of the system and the configuration and the overview of the operation of the user terminal according to the seventh embodiment are the same as those according to the first embodiment.

Figure 13:
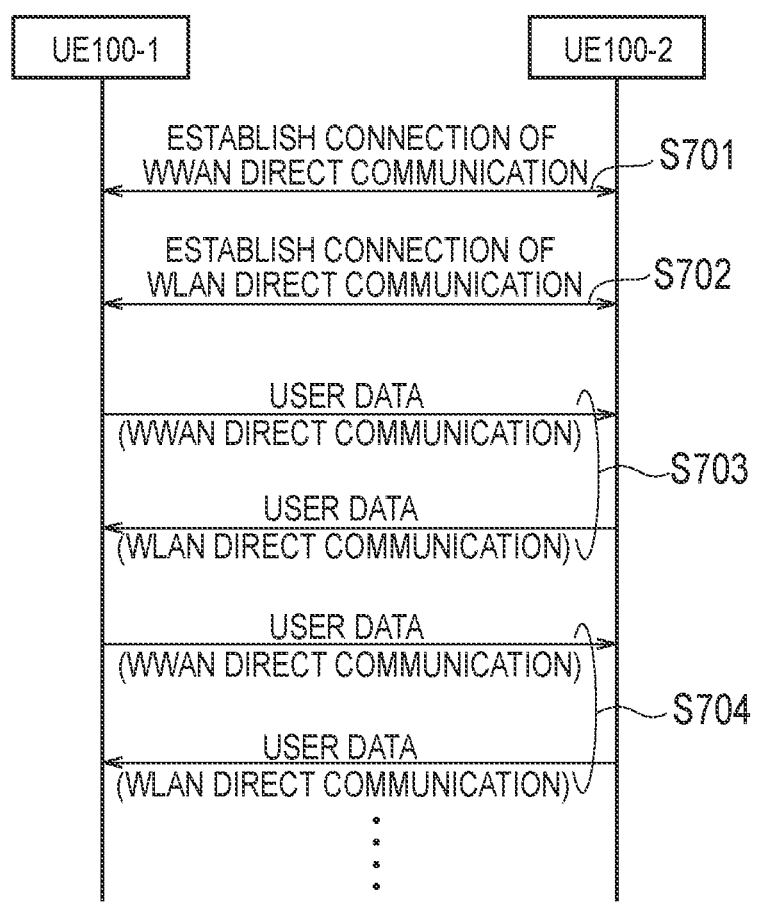
FIG. 13 is a diagram illustrating an operation sequence according to the seventh embodiment.

Hereinafter, an operation sequence according to the seventh embodiment will be described. In the seventh embodiment, the UE 100 performs one of transmission and reception of the user data through the WLAN direct communication and performs the other of the transmission and the reception through the WWAN direct communication. FIG. 13 is a diagram illustrating an operation sequence according to the seventh embodiment.

As illustrated in FIG. 13, in step S701, the UEs 100-1 and 100-2 establish connection of the WWAN direct communication.

In step S702, the UEs 100-1 and 100-2 establish connection of the WLAN direct communication.

In step S703, the UE 100-1 transmits the user data to the UE 100-2 via the connection of the WWAN direct communication. The UE 100-1 transmits the control signal to the UE 100-2 via the connection of the WWAN direct communication.

On the other hand, the UE 100-2 transmits the user data to the UE 100-1 via the connection of the WLAN direct communication. It is preferable that the UE 100-2 transmits the control signal to the UE 100-1 via the connection of the WWAN direct communication.

In step S704, the UE 100-1 transmits the user data to the UE 100-2 via the connection of the WWAN direct communication. The UE 100-1 transmits the control signal to the UE 100-2 via the connection of the WWAN direct communication.

On the other hand, the UE 100-2 transmits the user data to the UE 100-1 via the connection of the WLAN direct communication. It is preferable that the UE 100-2 transmits the control signal to the UE 100-1 via the connection of the WWAN direct communication. Thereafter, the same operation is repeated. The transmission timings of the mutual user data of the UEs 100-1 and 100-2 in steps S703 and S704 may be simultaneous.

In the seventh embodiment, since full-duplex communication of the user data can be performed using the WWAN direct communication and the WLAN direct communication, a communication speed of the user data can be improved.

Eighth Embodiment

Next, in an eighth embodiment, differences from the first to seventh embodiments will be mainly described. The configuration of the system and the configuration and the overview of the operation of the user terminal according to the eighth embodiment are the same as those according to the first embodiment.

Figure 14:
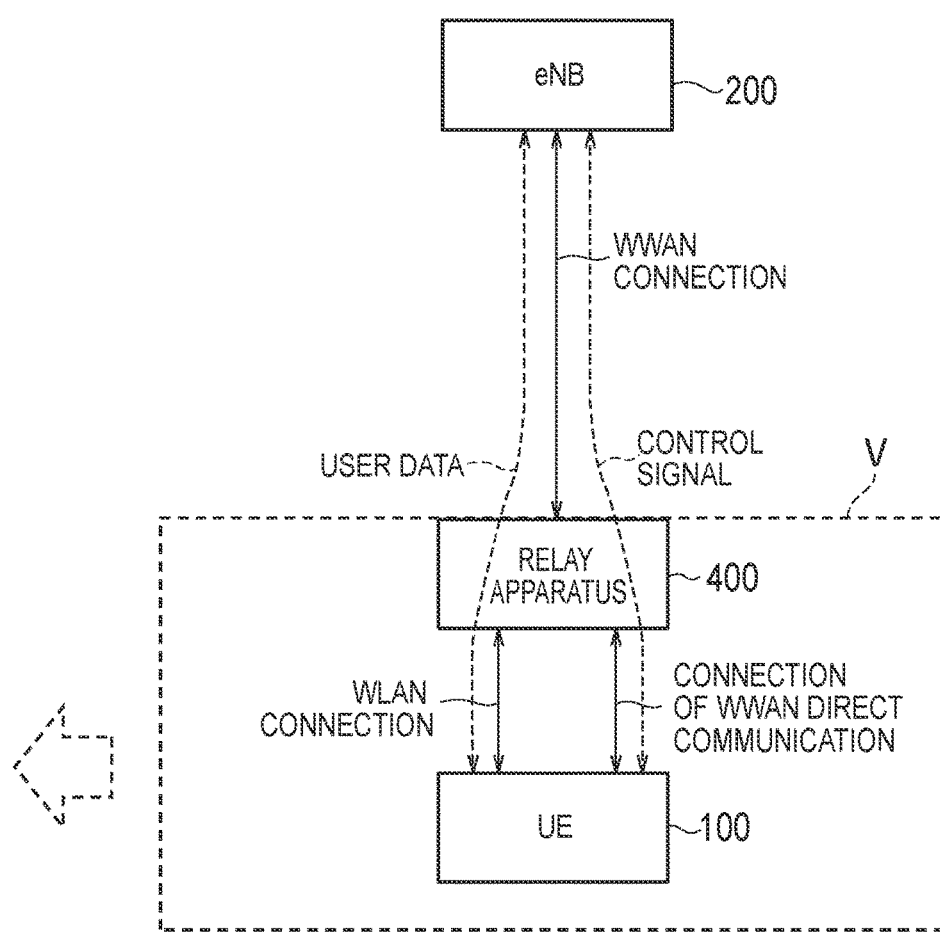
FIG. 14 is a diagram illustrating an overview of an operation of the UE according to the eighth embodiment.

Hereinafter, an overview of the operation of the UE 100 according to the eighth embodiment will be described. FIG. 14 is a diagram illustrating an overview of an operation of the UE 100 according to the eighth embodiment.

As illustrated in FIG. 14, a relay apparatus 400 is installed in a vehicle V such as a bus or a train. The relay apparatus 400 is an apparatus (a relay node or an access point) in which the WWAN communication is applied to a backhaul line and the WLAN communication is applied to an access line. The WLAN communication is not limited to the WLAN direct communication. The relay apparatus 400 performs handover as the vehicle V moves.

The UE 100 is located inside the vehicle V. The UE 100 in the vehicle V establishes connection with the relay apparatus 400. Specifically, the UE 100 establishes connection of the WLAN communication and connection of the WWAN direct communication with the relay apparatus 400. The UE 100 transmits and receives the user data via the connection of the WLAN communication, and transmits and receives a control signal via the connection of the WWAN direct communication.

As a result, a user data path between the UE 100 and the eNB 200 is configured by WWAN connection between the eNB 200 and the relay apparatus 400 and WLAN connection between the relay apparatus 400 and the UE 100. In contrast, a control signal path between the UE 100 and the eNB 200 is configured by WWAN connection between the eNB 200 and the relay apparatus 400 and connection of the WWAN direct communication between the relay apparatus 400 and the UE 100.

According to the eighth embodiment, when many UEs 100 board on the vehicle V which are moving, each UE 100 is accommodated in the relay apparatus 400 without performing handover (or cell reselection). That is, the many UEs 100 can be prevented from simultaneously performing handover processes (or a position registration process accompanied by the cell reselection). Thus, it is possible to suppress an increase in WWAN loads caused due to the handover processes (or a position registration process accompanied by the cell reselection).

Other Embodiments

The invention is not limited to a case in which the above-described embodiments are individually performed, but two or more of the embodiments may be combined.

In the above-described embodiments, the control signal of the WWAN has not been particularly mentioned, but the control signal of the WWAN may be encapsulated on WLAN to be transmitted and received.

In the above-described embodiments, the example in which the WWAN communication standard is the 3GPP LTE standard has been described. However, a WWAN communication standard other than the 3GPP LTE standard may be used.

In the above-described embodiments, the example in which the WLAN communication standard is the Wi-Fi standard has been described. However, a WLAN communication standard other than the Wi-Fi standard may be used.

CROSS REFERENCE

Priority is claimed on Japanese Patent Application No. 2014-211946 (filed Oct. 16, 2014), the content of which is incorporated herein by reference.

INDUSTRIAL APPLICABILITY

The present invention is useful in radio communication fields.

The invention claimed is:
1. A user terminal that supports wireless local area network (WLAN) communication and wireless wide area network (WWAN) communication, the WWAN communication including WWAN direct communication which is inter-terminal direct communication in conformity to a WWAN communication standard, the user terminal comprising:
a controller configured to:
apply the WLAN communication to a user plane while applying the WWAN direct communication to a control plane,
transmit and receive a control signal through the WWAN direct communication, and
in a case that the user terminal serves as an access point in the WLAN communication, establish the WWAN direct communication with another user terminal serving as another access point, wherein
the control signal includes information for scheduling radio resources for the WLAN communication.
2. The user terminal according to claim 1, wherein the WLAN communication includes WLAN direct communication which is inter-terminal direct communication in conformity to a WLAN communication standard, and
the controller is configured to transmit and receive user data through the WLAN direct communication.
3. The user terminal according to claim 1, wherein the control signal includes information for controlling the WLAN communication.
4. The user terminal according to claim 3, wherein the information is information necessary to establish connection of the WLAN communication.
5. The user terminal according to claim 4, wherein the controller is configured to, in a case that the controller determines that connection of the WLAN communication is not maintainable, perform control of establishing a new connection of the WLAN communication based on the information.
6. The user terminal according to claim 3, wherein the information is information for requesting or reporting at least one of transmission start of the user data, transmission stop of the user data, reception start of the user data, and reception stop of the user data.
7. The user terminal according to claim 3, wherein the information is at least one of acknowledgment information, channel state information, and modulation coding scheme information.
8. The user terminal according to claim 2, wherein the controller is configured to, in a case that the controller determines that connection of the WLAN communication is not maintainable, perform control of switching the user plane from the WLAN communication to the WWAN communication.
9. The user terminal according to claim 2, wherein based on a WWAN radio signal received from the another user terminal, the controller is configured to determine whether connection of the WLAN direct communication is able to be established or maintained with the other user terminal.
10. The user terminal according to claim 1, wherein the WLAN communication includes WLAN direct communication which is inter-terminal direct communication in conformity to a WLAN communication standard, and
the controller is configured to perform one of transmission and reception of user data through the WLAN direct communication, while performing the other of the transmission and the reception of the user data through the WWAN direct communication.

11. A processor that controls a user terminal supporting wireless local area network (WLAN) communication and wireless wide area network (WWAN) communication, the WWAN communication including WWAN direct communication which is inter-terminal direct communication in conformity to a WWAN communication standard, the processor configured to:
- apply the WLAN communication to a user plane while applying the WWAN direct communication to a control plane,
- transmit and receive a control signal through the WWAN direct communication, and
- in a case that the user terminal serves as an access point in the WLAN communication, establish the WWAN direct communication with another user terminal serving as another access point, wherein
- the control signal includes information for scheduling radio resources for the WLAN communication.

* * * * *